United States Patent [19]

Sukawa et al.

[11] Patent Number: 4,977,064

[45] Date of Patent: Dec. 11, 1990

[54] OPTICAL RECORDING MEDIUM AND PROCESS FOR FABRICATING THE SAME

[75] Inventors: Hiroshi Sukawa; Sumio Hirose, both of Yokohama; Shigeru Takahara, Kamakura; Tomoyoshi Sasakawa, Tokyo, all of Japan

[73] Assignees: Mitsui Toatsu Chemicals, Incorporated, Tokyo; Yamamoto Chemicals, Incorporated, Yao, both of Japan

[21] Appl. No.: 187,467

[22] Filed: Apr. 28, 1988

[30] Foreign Application Priority Data

May 1, 1987 [JP] Japan ................................. 62-106330

[51] Int. Cl.$^5$ ........................... G11B 7/24; G03C 1/73
[52] U.S. Cl. ..................................... 430/270; 430/495; 430/945; 346/135.1; 427/162
[58] Field of Search ............... 430/270, 495, 945, 273; 346/135.1; 427/162, 164

[56] References Cited

U.S. PATENT DOCUMENTS

| | | | |
|---|---|---|---|
| 4,230,939 | 10/1980 | de Bont et al. | 235/488 |
| 4,639,745 | 1/1987 | Matsui et al. | 346/135.1 |
| 4,696,892 | 9/1987 | Abe et al. | 430/495 |
| 4,798,781 | 1/1989 | Hirose et al. | 430/270 |

*Primary Examiner*—Paul R. Michl
*Assistant Examiner*—Mark R. Buscher
*Attorney, Agent, or Firm*—Oblon, Spivak, McClelland, Maier & Neustadt

[57] ABSTRACT

This invention relates to an optical recording medium characterized by high sensitivity, high stability, etc., and a process for making the optical recording medium. Specifically, the present invention provides an optical recording medium composed of a transparent substrate having prepits and/or pregrooves for system control signals and first and second recording layers formed thereon in order, the both layers having individually a specific reflectance, transmittance and absorbance. To the optical recording medium, a laser beam is irradiated on the transparent substrate side to record or read out information and, by detecting the variation of the amount of light as a sum of the reflected light from the boundary between the first recording layer and the substrate and the reflected light from the boundary between the second recording layer and the air, the system control signals are primarily obtained from the prepits and/or pregrooves. Regarding the two recording layers, the first recording layer contains an organic dye having a transmittance of 10–50% and an absorbance of 40% or more against the wavelength of a laser beam used for writing while the second recording layer contains an organic dye having an absorbance of 20% or less and a reflectance of 25% or more at the air boundary at the wavelength region of the laser beam.

The optical recording medium can be made in accordance with the process of the present invention wherein (a) a transparent substrate having prepits and/or pregrooves for system control signals is provided, (b) two kinds of solution are prepared by allowing two organic dyes each soluble exclusively in either a low-polar solvent or else a high-polar solvent to dissolve in the respective counterpart solvent, and (c) the two kinds of dye solution are applied on the transparent substrate in series to form the first recording layer and the second recording layer.

9 Claims, No Drawings

OPTICAL RECORDING MEDIUM AND PROCESS FOR FABRICATING THE SAME

BACKGROUND OF THE INVENTION:

(i) Field of the Invention:

This invention relates to a write-once optical recording medium using a converged beam of semiconductor laser. This invention also relates to a process for the fabrication of such an optical recording medium productively by forming recording layers thereof by the coating method.

(ii) Description of the Prior Art:

As write-once optical recording media of the above-described sort, there have been proposed recording media having inorganic recording layers of thin films of low melting-point metals such as tellurium, tellurium alloys and bithmuth alloys and, as disclosed in U.S. Pat. No. 4,298,975 for example, recording media making use of phthalocyanine dyes as recording layers.

These recording media are low in productivity, since their recording layers have to be formed in vacuo by vacuum evaporation, sputtering or the like. Further, media having inorganic recording layers are limited in recording density due to the greater thermal conductivities of the recording layers. Further, these media are liable to deteriorate significantly from oxidation in the air. There is also a potential danger with respect to toxicity since they employ poisonous materials such as tellurium.

With a view toward providing a solution to the above-described problems, optical recording media with recording layers formed by coating soluble organic dyes have been proposed. For example, processes making use of the spin coating technique have been developed to coat organic dyes which are soluble in organic solvents and exhibit absorption in the oscillation wavelength range of semiconductor lasers, such as dithiol metal complexes, polymethine dyes, squarylium dyes and naphthoquinone dyes. Some of these processes have already been put into practice. Such conventional recording media, however, have poor durability as demonstrated by those containing, for example, cyanine or squarylium dyes as recording layers out of the dyes proposed to date. Further, they require additionally reflective thin layers made of inorganic materials such as metals or metal oxides for supplementing their reading function, because they have substantially low reflectances when provided solely with recording layers of dyes such as dithiol metal complexes.

For example, U.S. Pat. No. 4,492,750 relates to media which use alkyl-substituted naphthalocyanine dyes. It discloses an optical recording medium having reflective layer of a material such as Al provided on a glass or polymethyl methacrylate substrate and a layer of an optical recording composition provided on the reflective layer and containing vapor-treated particles of an alkyl-substituted naphthalocyanine dye, the particle sizes of which range from 0.005 μm to 0.1 μm, dispersed in a polymeric binder. As disclosed in the above U.S. Patent, the optical recording layer cannot be formed directly on the substrate and the reflective layer made of an inorganic material such as Al must be formed additionally on the substrate by a vacuum process such as vacuum evaporation. The fabrication process of the optical recording medium is thus rather complicated.

In addition, the above optical recording medium is accompanied by a more serious problem. A recording layer making use of an organic dye has an inherent feature of low thermal conductivity. Hence, it is potentially expected to exhibit high recording sensitivity. When a reflective layer made of a metal or inorganic material having high thermal conductivity is provided, the thermal energy produced by a writing laser beam irradiated onto the recording layer is however caused to dissipate through the reflective metal layer due to the high thermal conductivity of the reflective metal layer, so that the thermal energy is not effectively used for the formation of pits and holes. As a result, the recording sensitivity is reduced considerably.

In the case that a reflective layer made of an inorganic material such as Al is provided, when a laser beam is irradiated through the substrate for recording signals or reading them out, the laser beam is not allowed to reach the recording layer even if the substrate itself is transparent. This is obvious because the laser beam is shut off by the reflective layer of the metal or inorganic material which practically prevents transmission of light therethrough. Whenever such a reflective layer is provided, it is naturally impossible to perform the recording and reading-out of signals through the associated substrate. Accordingly, the recording and reading-out of signals have to be conducted on the side of the recording layer.

In this case, the slightest existence of dust or scratches on the surface of the recording layer results in considerable disturbance to the accurate recording and reading-out of signals which take the form of pits and holes. For practical application, the above-mentioned optical recording medium thus requires a dust protective layer as an overcoat on the recording layer. If it becomes feasible to conduct the recording and reading-out of signals by means of a laser beam through a transparent substrate, such a dust protective layer will not be required at all. It is because the existence of dust or scratches on the medium surface on the incident side of the laser beam, where the laser beam is still un-focused, has no effect on recording and reading-out of the signals, due to the distance corresponding to the thickness of the substrate. As described above, optical recording media with reflective layers made of inorganic (metallic) materials such as Al are accompanied by numerous drawbacks.

On the other hand, in Japanese Patent Laid-Open No. 112794/'83, there is proposed what is called a function-separating recording film formed by laminating a high-reflective dye layer which is not caused to change by a laser beam and a layer of a light-absorptive organic substance.

Further, Japanese Patent Laid-Open No. 224448/'83 relates to a function-separating recording layer formed by laminating a reflective layer comprising a bronze-lustrous organic substance or low melting point metal and an absorptive layer composed of an organic substance. It proposes a stable recording layer making a good use of the characteristics cf an organic dye and superb in recording and reading-out of signals.

In Japanese Patent Laid-Open No. 239948/'85, a proposal is made to use a cyanine dye or merocyanine dye as a reflective layer and laminate thereon an absorptive layer, thereby preparing an optical information recording medium which protects the reflective layer from being affected by the surrounding atmosphere.

These inventions are based on the technological concept that a reflective layer is practically laminated on a substrate so that focal point control and reading-out of recording signals are effected by the reflected rays at the reflective layer and the boundary of the substrate. However, in this method, as the amount of reflected ray increases at the boundary of the substrate, the amount of the laser beam reaching the absorptive layer is decreased and the sensitivity is thus reduced. Further, when a cyanine dye or merocyanine dye is used as the reflective layer, it is apt to be deteriorated by the laser beam used for reading-out. Thus, it has a fatal defect in longterm use and also is liable to be deteriorated by room light.

The means for lamination proposed in Japanese Patent Laid-Open Nos. 112794/'83 and 224448/'83 are too disadvantageous in productivity and cost to put into practice. In the case of lamination of organic dyes by the evaporation-evaporation method or evaporation-coating method, dyes useful in the evaporation method are inherently very limited and therefore dyes usable in this method are restricted to those having specific molecular structures. Moreover, these optical recording media are fabricated with substantially the same complexity as in the formation of reflective layers comprising inorganic compounds, and hence their productivity is lowered.

On the other hand, in the case of lamination by the coating-coating method, no such defects are observed. However, it becomes an important subject not to give damage to the substrate being coated. It is because that substrates for optical recording media generally have pregrooves with a pitch of several micrometers for an optical beam to conduct recording and reading-out of signals and also address signals and control signals called prepits in the form of minute pits and holes, and the deterioration of these pregrooves and prepits has to be absolutely avoided. Further, when a recording layer of a laminated structure is formed by the coating-coating method, there is a subject that no deterioration must be caused in the first layer and the above-described pregrooves and prepits. Furthermore, no proposal has been made to date to obtain necessary information for this sort of system control securely.

In view of the foregoing technical background, there has been an urgent need to develop optical recording media which are highly sensitive in recording, are stable to a reading light or room light, and are capable of obtaining system control signals securely.

SUMMARY OF THE INVENTION

An object of the present invention is to provide an optical recording medium which is capable of recording signals in an highly sensitive manner.

Another object of the present invention is to provide an optical recording medium which is extremely stable for a long period of time to a laser beam used for reading-out and a room light.

A further object of the present invention is to provide an optical recording medium which is capable of obtaining system control signals sufficiently upon writing signals and reading them out.

A still further object of the present invention is to provide a process for the fabrication of an optical recording medium having the characteristics as described above by the coating-coating method.

Other objects of the present invention will become apparent from the following description.

The aforesaid objects and other objects of the present invention are achieved by:

an optical recording medium composed of a transparent substrate having prepits and/or pregrooves for system control signals, a first recording layer formed thereon, a second recording layer further formed thereon, which comprises:
  (a) the first recording layer being a recording layer containing an organic dye having a transmittance of 10–50% and an absorbance of 40% or more at the wavelength of a laser beam used to write information;
  (b) the second recording layer being a recording layer containing an organic dye having an absorbance of 20% or less and a reflectance of 25% or more at the air boundary at the wavelength of the laser beam used to write and/or read out information; and
  (c) the laser beam being irradiated to the medium on the transparent substrate side to write and read out information, thereby the system control signals from the prepits and/or pregrooves being primarily obtained by detecting the variation of the amount of light as a sum of the reflected light from the boundary between the first recording layer and the substrate and the reflected light from the boundary between the second recording layer and the air layer in contact therewith, and a process for making an optical recording medium composed of, a transparent substrate having prepits and/or pregrooves for system control signals, a first recording layer formed thereon, and a second recording layer further formed thereon, which comprises:
  (a) providing a transparent substrate having prepits and/or pregrooves for the system control signals;
  (b) preparing two kinds of solutions, one comprising a low-polar solvent(s) and organic dye(s) soluble only in low-polar solvents, the other comprising a high-polar solvent(s) and organic dye(s) soluble only in high-polar solvents, (each of the organic dye(s) being in a dissolved state),
  (c) applying the two kinds of dye solution on the transparent substrate in sequence to form the first recording layer and the second recording layer, thereby forming a bilayered structures.

DETAILED DESCRIPTION OF THE INVENTION

The optical recording medium of the present invention comprises a first recording layer on a transparent substrate and a second recording layer on the first recording layer, the both layers containing individually an organic dye having a specific transmittance, reflectance and absorbance.

The transmittance (expressed as T%) and the reflectance (expressed as R%) of the first recording layer and the second recording layer are defined herein as follows.

The first and second recording layers containing respective specific organic dyes are formed independently on a substrate (the thickness of each of the layers containing the organic dyes is adjusted to the thickness of each of the first and second recording layers laminated as described above). The transmittance and the reflectance are measured by irradiating a parallel ray of the same wavelength as the laser beam used for writing or reading information onto the flat area of the substrate at an angle of incidence (angle of reflectance) of 5°, assuming the amount of the incident ray as 100%. The absorbance (expressed as A %) is calculated from the equation T+R+A=100, using T and R measured as described above. The measurements of the first recording layer are obtained by irradiating the ray on the substrate side, while those of the second layer are obtained by irradiating the ray on the side of the second recording layer containing an organic dye.

The optical recording medium of the present invention comprises a first recording layer formed on a transparent substrate and a second recording layer further formed thereon as recording layers.

The first recording layer is basically a light absorption layer, whereas the second recording layer is substantially a light reflection layer.

More specifically, the optical recording medium of the present invention is composed in such a way that: the first recording layer is a recording layer containing an organic dye which has a transmittance of 10-50% and an absorbance of 40% or more in the wavelength range of a laser beam used for writing or reading information, and the second recording layer is a recording layer containing an organic dye which has an absorbance of 20% or less and a reflectance of 25% or more at the boundary to the air in the wavelength range of the laser beam.

When a laser beam is irradiated onto a thus-composed optical recording medium of the present invention on the side of its transparent substrate, i.e., through the substrate, the following phenomenon will take place.

In the first recording layer, the absorbance of a laser beam is as large as 40-80% and therefore its optical energy is absorbed in the layer to a large extent so that the layer constitutes a heat-generating layer involving generation of heat. Further, since the first recording layer has a transmittance of 10-50%, a portion of the incident laser beam transmits through the first recording layer and reaches the second recording layer. In the second recording layer, the absorbance of the laser beam is as low as 0-20% so that the incident laser beam transmits through the second recording layer to the boundary, where the second recording layer is in contact with the air. The reflectance at the air boundary is as large as 25%-90% so that the laser beam is reflected there to the largest extent and transmits again through the second recording layer and the first recording layer in series to reach the substrate and eventually a photodetector.

The photodetector detects the amount of light at all times as an optical sum of the reflected light from the boundary between the first recording layer and the substrate and the reflected light from the boundary between the second recording layer and the air layer being in contact therewith.

Further, in the part provided with prepits or pregrooves for system control signals, the thicknesses of the both first and second recording layers formed thereon are different from the thickness of the recording layer on the flat area of a substrate, which causes a large variation in the amount of reflected light. In other words, in the part provided with prepits or pregrooves, variation in the amount of the reflected light from the boundary between the first recording layer and the substrate is incorporated with a large variation in the amount of the reflected light from the boundary between the secondary recording layer and the air layer. A definite variation in the amount of reflected light is produced. By detecting this definite variation, signals necessary and sufficient for system control are obtained.

Thus, in the present invention, a light absorptive layer is used as a first recording layer in place of a light reflective layer, the medium absorbs more amount of laser than a medium in which a highly reflective layer is used as the first layer, so that the recording sensitivity is improved. Moreover, the amount of light to the second recording layer containing a highly-reflective organic dye which is generally weak to optical degradation can be controlled by absorbing the light in the first recording layer. This clearly improves the degradation of the organic dye layer caused by reading light or room light.

On writing information in an optical recording medium of the present invention, heat generates primarily in the first recording layer by irradiating a laser beam for writing, and fusion and decomposition take place in both of the first and second recording layers, resulting in the formation of pits. Further, by the formation of the pits, that is, by the dissipation of the section corresponding to the pit section of the highly-reflective second recording layer, the reflectance of the pit section is reduced, thus permitting the information to be read out.

In the optical recording media of the present invention, the thickness of the first recording layer is preferably 30-200 nm and more preferably 50-150 nm in the flat area, while that of the second recording layer is preferably 10-200 nm and more preferably 20-150 nm in the flat area. The thickness of the whole recording layer comprising the first and second layers is 40-400 nm, preferably 60-300 nm. Preferred thickness ranges of the first and second recording layers are determined in consideration of the secure system control signals and recording sensitivity.

A variety of methods are applied to the measurement of the film thickness and it is generally difficult to obtain accurate measurements of such organic thin films. In the present invention, measurements with an Ellipsometer or those obtained by measuring the section of a medium with a microscope are used. Measurement of the thickness is significantly difficult when the substrate has pregrooves on its surface. However, it is practically possible to substitute for the thickness a film thickness of a dye layer formed by fixing a dye on the same substrate without pregrooves or the like.

No particular limitations are placed on the substrate used in the present invention as long as it is a light-transmittable substrate and possesses prepits and/or pregrooves. Its light transmittance is preferably 85%. Further, those having a smaller degree of optical anisotropy (birefrigence) are preferred. Typical examples thereof include glass substrates and resinous substrates. From economical viewpoint, as preferred resinous substrates may be mentioned those of acrylic resins, polycarbonate resins, polyolefin resins, allyl resins, polyester resins, polyamide resins, vinyl chloride resins, polyvinyl ester resins, epoxy resins and the like, on which pregrooves and/or prepits can be formed directly by injection molding.

The depth of the prepits or pregrooves formed in advance on each of the foregoing substrates may preferably be in the range of 50-200 nm. With a depth in this range, it is possible to obtain system control signals in an efficient manner. The depth of the prepits and that of pregrooves may be different from each other as long as they are in the above-described range. Prepits called wobble marks for track control of a laser head may also be used in place of pregrooves.

The organic dye useful in the formation of the above described first recording layer in the present invention is an organic dye exhibiting a strong absorbance to a wavelength in the wavelength range of 600-900 nm, preferably 650-850 nm, which are the oscillation wavelengths of the laser beam (generally semiconductor laser beam) used in the present invention. This organic dye may include polymethine dyes, merocyanine dyes, azaannulene dyes, anthraquinone dyes, naphthalenedione dyes, dithiol metal complex dyes, diamino metal complex dyes, and xanthene and triphenyl methane dyes.

From the viewpoint that the dye should have a strong absorbance in the oscillation wavelength regin of semiconductor laser and be stable to a reading light, anthraquinone dyes, naphthalenedione dyes, azaanulene dyes, dithiol metal complex dyes and diamino metal complex dyes are preferred among the above-described dyes. Among others, azaannulene dyes such as phthalocyanine dyes, phthalo-naphthalocyanine dyes and naphthalocyanine dyes are particularly preferably used. These azaanulene dyes have already been used in industry in large amounts as reliable pigment in respect of light resistance. Therefore, the azaanulene dyes have the merit of being readily available.

As the dye useful in the formation of the second recording layer in the present invention, there is adopted a dye which exhibits a strong reflectance to a wavelength in the wavelength range of 600-900 nm, preferably 650-850 nm, which are the oscillation wavelengths of the laser beam (generally semiconductor laser beam) used in the present invention and shows a relatively small absorbance in the wavelengths region to which the dye exhibits a strong reflectance. For example, cyanine dyes and merocyanine dyes as polymethine dyes; and phthalocyanine dyes, phthalonaphthalocyanine dyes, which have both benzene skeleton and naphthalene skeleton in a molecule, naphthalocyanine dyes; and porphyrin dyes as azaanulene dyes are preferred. Polymethine dyes are especially preferred. A cyanine dye which has 5 carbon atoms in its main chain $-(CH=CR)_2-CR=$ is particularly preferred in that it has an absorbance of 20% or less.

As a matter of course, the double bond unit may be replaced by squaryllum, croconium or the like. As the donor components of both terminals, indoline, benzoindoline, thiazole, benzothiazole, quinoline, benzoxazole, azulene and the like may be used.

Thus, the second recording layer in the present invention is substantially light reflection layer. It goes without saying that no particular restrictions are imposed on the organic dye used in this layer so far as it exhibits little absorbance but a high reflectance to the oscillation wavelengths of the semiconductor laser beam used for recording or reading-out. Among others, the above-described polymethine dyes are favorably used.

In the present invention, either of the first and second recording layers can be formed by the coating method. This method is greatly advantageous from economical point of view.

In order to fabricate an optical recording medium, two solvents are provided first, i.e., a low-polar solvent and a high-polar solvent. Two dyes each soluble exclusively in one or the other of the solvents are selected from among the above-described dyes. The two dyes are dissolved in their respective counterpart solvents to prepare two solutions.

Accordingly, it is preferable that the organic dyes to be used in the first and second recording layers are soluble correspondingly in their respective solvents. However, if the solubilities of these dyes are not sufficient, the dyes can be converted to those soluble in the differently polar solvents by introducing a suitable substituent as illustrated below into the molecule of each of the dyes. Several parameters may generally be given to indicate the polarity of a solvent. In the present invention, dielectric constant is used as the parameter. The dielectric constants as employed herein are those at 20° C.

A substituent involving an alkyl group may be selected as the above-described substituent. A suitable substituent may be selected from among an alkyl group, alkenyl group, alkoxy group, alkylaryl group, arylalkyl group, alkylcarbonyl group, alkoxycarbonyl group, alkylamino group, alkylimino group, alkylcarboxyamide group, alkanoylimino group, alkanesulfenyl group, alkanesulfonyl group, and alkanesulfonamide group, etc.

By lengthening the alkyl chain of a substituent involving an alkyl group, it is possible not only to increase the solubility of a dye to a low-polar solvent, that is, to a solvent with a low dielectric constant, particularly as low as 4.5 or less, but also to improve the film forming ability of the resulting dye solution.

Further, as an alternative means to increase the solubility of dye, it is also possible to adopt a method according to which the dye is converted to a dye of salt-structure. Cyanine dyes, dithiol metal complex dyes and diamino metal complex dyes in particular can be converted to dyes of salt-structure by any method known in the art. As the counter ion, for example, a quaternary ammonium cation, $Na^+$, $BF_4^-$, $B(C_6H_3(CF_3))_4^-$, $CH_3COO^-$, $I^-$, $Br^-$, $ClO_4^-$, etc. may be selected. By changing the combination of the counter ion, the solubility of a dye to a solvent can be adjusted in a desired range.

On the other hand, by introducing into the molecule of a dye a substituent having at its terminal a high-polar group such as a hydroxyl group, amino group, carboxyl group, carbamoyl group, mercapto group, mercaptoamino group, sulfomoyl group, sulfonic acid group and sulfonamino group, it is possible to improve the solubility of the dye to a high-polar solvent and, in some cases, to a solvent with an dielectric constant of 12 or more.

As specific examples of the soluble dye, may be mentioned an aromatic or unsaturated aliphatic dithiol metal complex, aromatic or unsaturated aliphatic diamine metal complex and tert-butylphthalocyanine, which are already known in the art. Further, soluble phthalocyanine dyes disclosed in Japanese Patent Laid-Open No. 146682/'87, etc. proposed by the present applicants, soluble naphthalocyanine dyes disclosed in Japanese Patent Laid-Open No. 268487/'86, etc., polymethine dyes, squarylium dyes, naphthoquinone dyes and anthraquinone dyes are mentioned as preferred dyes.

Specific examples of the low-polar solvent useful in the present invention, particularly of solvents having dielectric constants of 1-4.5 at 20° C., may preferably include aromatic carbons, such as benzene, toluene, xylene, cumene, and aliphatic hydrocarbons, such as pentane, hexane, 2-methylbutane, 3-methylpentane, octane, 2,2,4-trimethylpentane, decane, dodecane, cyclohexane, cyclopentane, decaline, cyclohexene, and ethers, such as diethyl ether, divinyl ether, dibutyl ether, anisole, dioxane, and halogenated hydrocarbons, such as, dichloroethane, carbon tetrachloride, p- dichlorobenzene, and carbon disulfide etc. These solvents may be used as a mixed solvent. It is naturally possible to use a mixed solvent having a dielectric constant of 4.5 or less, which is formed by mixing any of the above-described solvents with a solvent having a dielectric constant of more than 4.5.

In particular, in order to prevent the resinous substrate from being damaged and to further decrease the dissolution of the dyes into each other's solvents upon forming recording layers having structure, it is desirable to combine selectively a solvent (or mixed solvent) preferably having a dielectric constant of 2.5 or less and a dye soluble to the solvent. A combination of a hydrocarbon solvent or a mixed solvent of a hydrocarbon solvent with other solvent and a dye soluble to the solvent is more preferred.

On the other hand, exemplary high-polar solvents useful in the present invention, particularly those having dielectric constants of 12–90 at 20° C., may include ketones such as, acetone, methyl ethyl ketone, cyclohexanone, and alkoholes such as, methanol, ethanol, 1-propanol, 2-propanol, 1-butanol, 2-butanol, 1-hexanol, cyclopentanol, ethylene glycol, and ethers such as, ethylene glycol monomethyl ether, ethylene glycol monoethyl ether, and acetonitrile, water. As a matter of course, a mixed solvent formed by mixing a solvent having a dielectric constant of less than 12 and any of the above-described solvents may also be used without any inconvenience, so far as it has a dielectric constant of 12 or more.

With a view to minimizing the damage to the resinous substrate and the dissolution of the dyes to each-other's solvent upon formation of laminated recording layers, it is particularly desirable to combine an alcohol or water or a mixed solvent thereof with other solvent and a dye soluble thereto.

The dielectric constant is given as a ratio C/Co wherein C is a capacitance measured when a substance is held between the plates of a capacitor and Co is a capacitance under vacuum, as is universally known. Its principle and measuring method are described, for example, in Shin Jikken Kagaku Koza 5, 265 (1976), edited by the Chemical Society of Japan, and are well known. The dielectric constants used in the present invention are those measured at 20° C. Specific measurements for various solvents are given, for example, in Kagaku Benran, Basic Volume (revised third edition), II-501, edited by the Chemical Society of Japan; S. L. Murov, Handbook of Photochemistry, p.85, Marcel Dekker, Inc. (1973); and Yozai Handbook, compiled by Shozo Asahara et al., Kodansha (1976). These measurements can be adopted as is. Naturally, new measurements may be made in accordance with the descriptions in the above reference.

In the present invention, two solvents, i.e., a low-polar solvent, particularly a solvent having a dielectric constant of 4.5 or less, and a high-polar solvent, particularly a solvent having a dielectric constant of 12 or more, are first provided. Two dyes each soluble exclusively in one or other of the solvents are allowed to dissolve in their respective counterpart solvents. The state in which a dye dissolves exclusively in either a solvent having a dielectric constant of 4.5 or less or a solvent having a dielectric constant of 12 or more signifies that the dye dissolves in one of the solvents in an amount of generally 0.3–10 wt. %, preferably 0.5–5 wt. % while it dissolves in the other of the solvents only in an amount of substantially zero to 0.1 wt. %. It is possible to produce such a state by the proper selection of a combination from among the above-described solvents and dyes.

In the present invention, for the purpose of improving the smoothness of a recording layer and minimizing defects including pin holes upon forming the recording layer, it is advisable to add a soluble resin such as nitrocellulose, ethylcellulose, acrylic resins, polystyrene, vinyl chloridevinyl acetate copolymer, polyvinyl acetate, polyvinyl butyral, polyester resins, and dimeric acid polyamide or an additive such as a leveling agent or antifoaming agent to the dye solution prepared as described above. However, if the resin or additive is added in an excessively large amount, the reflectance of the recording layer will be degraded, and the dye will not dissolve homogeneously in the recording layer to form a dispersed state, thereby reducing the reflectance as well as the sensitivity in recording. With such respects in view, the amount of the resin or additive to be added should be less than 20 wt. %, preferably 10 wt. % or less, particularly 0–5 wt. % in the recording layer.

In the present invention, a transparent resinous substrate having prepits and/or pregrooves for system control signals is provided and dye solution are applied on the substrate to form recording layers. Specifically, two solvents having respective dielectric constants of 4.5 or less and 12 or more at 20° C. are selected so as not to damage the sophisticated structure of the surface of such a resinous substrate. Then, two specific organic dyes each soluble exclusively in the respective one of the solvents are allowed to dissolve in the respective counterpart solvents to prepare two kinds of solution. The two specific solutions are applied on the transparent substrate in sequence to form first and second recording layers containing the organic dyes independently and bilayered structure is formed.

Any means can be used to apply the dye solution. This may be done, for example, by letting a dye solution flow down over a substrate or bringing the surface of a substrate into contact with the surface of a dye solution and then pulling it up from the dye solution, followed by rotation of the substrate to remove any excess solution, or by allowing a dye solution to flow over a rotating substrate. The first recording layer is thus formed. Thickness of the recording layer thus coated is so thin that the layer is dried spontaneously and fixed practically on the substrate in the course of coating. Therefore, no particular heating is usually needed to dry the layer. It goes without saying that the layer may thereafter be dried with hot air or the like, as required.

Subsequently, the same coating procedure is repeated with a dye solution having the opposite polarity to that of the dye solution used in the first coating step, thereby forming a second recording layer.

The most typical preferred embodiment of the present invention is described below. First, an azaanulene dye such as a phthalocyanine or naphthalocyanine dye modified with a non-polar substituent is allowed to dissolve in a low-polar solvent having a dielectric constant of 4.5 or less at 20° C. Then, a first recording layer is formed on a substrate. Thereafter, a cyanine dye having 5 carbon atoms in its main chain —(CR=CR-)$_2$—CR= is allowed to dissolve in a solvent having a dielectric constant of 12 or more at 20° C. Then, a second recording layer is formed on the first recording layer.

The substrates having recording layers are put together with their recording layers facing inside and with an air gap inbetween (double sided medium). Alternatively, one of the substrates is put similarly on a protecting plate (single sided medium). Thus, the resulting plate may generally be put into practical use.

The laser beam used for recording and reading out information in the present invention is a semiconductor laser beam having an oscillation wavelength in the range of 600–900 nm, preferably 650–850 nm. In the case of recording at a rate of 5 m/s, the output of the laser beam at the surface of the substrate may be the order of 4 mW–12 mW. The output for reading-out may be approximately 1/10 as much as that for recording, that is, the order of 0.4 mW–1.2 mW.

BEST MODE FOR PRACTICING THE INVENTION:

The present invention is specifically illustrated by the following examples. Since these examples are intended for illustration only, it should not be construed that the present invention is limited to the substances, conditions, process parameters, etc. contained in the examples.

EXAMPLES:

Substrate material:

Provided as substrates were injection-molded polycarbonate plates with a thickness of 1.20 mm, an outer diameter of 130 mm and a center hole diameter of 15 mm, on one side of which flat areas, and U-shaped pregrooves having a thickness of 100 nm and a bottom width of 60 nm and prepits of sector mark, VFO (variable frequency oscillation) mark, etc. were arranged. These plates were employed in the experiments described below.

Preparation of organic dye solution:

Two grams of each organic dye given in Table 1—1 and Table 1-2 were dissolved in 100 g of the respective counterpart solvent given also in Table 1 so as to obtain each of the organic dye solutions I–XII for forming organic dye films of the first and second recording layers. Table 1—1 gives organic dyes for forming recording films of the first layer, while Table 1-2 shows organic dyes for forming recording films of the second layer. In the same tables, dielectric constants of these organic dyes at 20° C. are also shown.

TABLE 1

| Number of organic dye solution | Kind of organic dye | kind of organic solvent | Dielectric constant |
|---|---|---|---|
| I | tetra(tertiaryoctyl)naphthalo-cyanine-vanadyl oxide | octane | 1.95 |
| II | hexadeca(tertiarybutylthiophenyl)phthalocyanine-copper | heptane | 1.92 |
| III | tetra(tertiaryheptyl)naphthalocyanine-colbalt | heptane | 1.92 |
| IV | 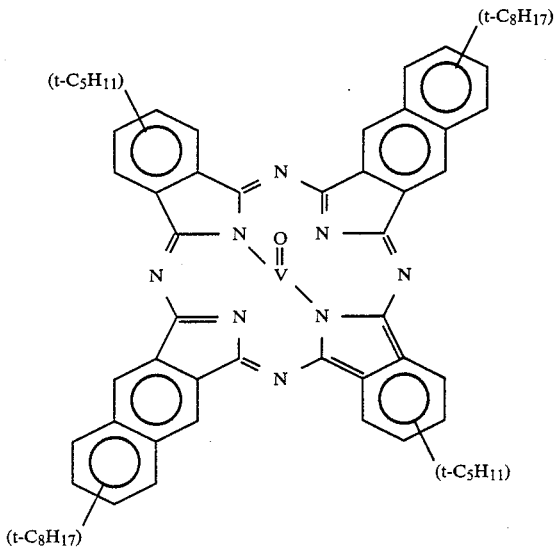 | heptane | 1.92 |
| V | tetra(tertiarydodecyl)naphthalo-cyanine-vanadyl oxide | hexane | 1.88 |
| VI | 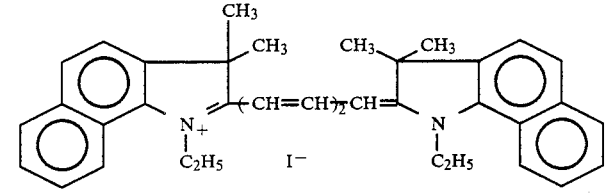 | methanol | 32.6 |

TABLE 1-continued

| Number of organic dye solution | Kind of organic dye | kind of organic solvent | Dielectric constant |
|---|---|---|---|
| VII | 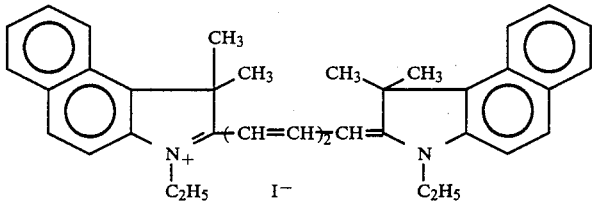 | methanol | 32.6 |
| VIII | 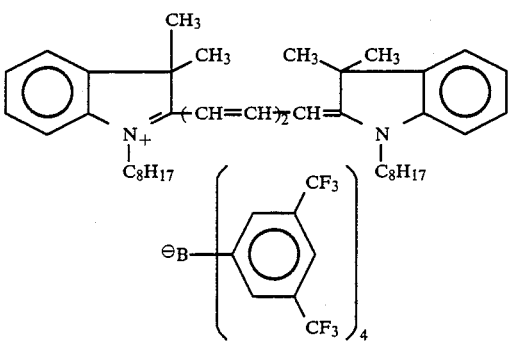 | methanol | 32.6 |
| IX | 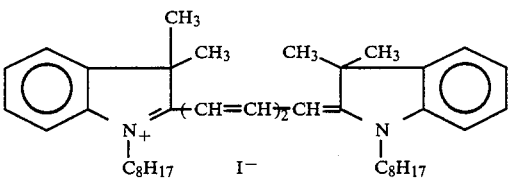 | methanol | 32.6 |
| X | 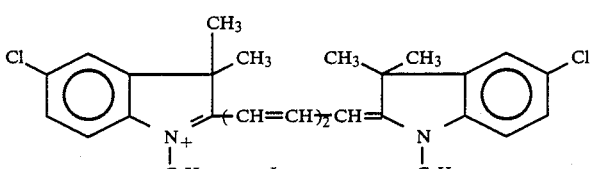 | ethanol | 24.6 |
| XI | tetra(carboxytetramethylammonium)-phthalocyanine-vanadyl oxide | ethanol | 24.6 |
| XII | 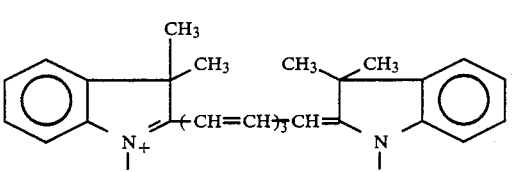 | ethanol | 24.6 |

Making optical recoridng medium:

The above-described substrate was fixed on a rotating table with the surface provided with pregrooves and prepits facing upward. Then, each of the organic dye solutions I–XII given in Table 1 was allowed to flow down onto the inner periphery of the substrate through a filter by means of a dispenser while the substrate was rotated at the revolution given in Table 2, thereby forming each of the single organic dye films of Experiments 1–18. Then, using the flat area of the substrate, its transmittance and reflectance were measured by mean of a parallel ray of 830 nm wavelength or 780 nm wavelength. These measurements, the absorbance calculated therefrom (100—(transmittance+reflectance)) and the film thicknesses obtained by measuring the section of the medium with a microscope are also shown in Table 2.

In Table 2, 1–5 are suitable films as the first recording layer, while 6–11 are suitable films for the second recording layer. In 12–17 are given exemplary single dye films for comparative purpose. In 18 is given an exemplary single organic dye film formed by using a solution of a cyanine dye having 7 carbon atoms in its main chain —(CH=CR)$_3$—CR=.

Then, as illustrated in Table 3, the single organic dye films in Table 2 were combined (the way of combination is indicated by the Experiments) and based on each combination, the second recording layer was formed on the organic dye film of the first recording layer by the same procedure as in the first recording layer to fabricate each of the optical recording media A–M. In this case, the rotating conditions of each spin coating were the same as those given in Table 2 for the respective organic dye solutions. In Table 3, the optical recording media A-G are for Examples of the present invention, while the optical recording media H-U are for Comparative Examples.

All of the optical recording media obtained according to the above-described procedure did not cause any damage to the first recording layer upon forming the second recording layer or any deformation of the prepits and pregrooves.

Evaluation of optical recording media:

In Table 3 are given the results of the evaluation of system control signals from prepits and pregrooves, recording sensitivity characteristics, stability to reading light, and light stability upon exposure to room light with respect to each of the optical recording media A-J.

From these results, it is ascertained that the optical recording media of the present invention are capable of obtaining enough control signals for system control, and are also improved significantly in recording sensitivity and stability to reading light and room light, as compared with those of Comparative Examples.

In other words, all of the optical recording media of the present invention gave satisfactory characteristics in all evaluation items including control signal evaluation, recording sensitivity and stability to a reading light and room light. On the contrary, the optical recording media of Comparative Examples could not satisfy all of the evaluation items at the same time such that those of excellent control signal evaluations had degraded recording sensitivities and those having high recording sensitivities were inferior in stability to a reading light and room light. This signifies that only the optical recording media of the present invention have sufficient potential availability from industrial point of view.

Comparative Examples are described in more detail hereinbelow. Comparative Examples H-L are examples in which an optical recording medium is so formed that the film thickness of the first recording layer is outside the scope of the present invention. In examples in which the first recording layer is too thick, it is found that no sufficient control signal are obtainable and in addition $I_o$ is reduced. Further, as seen in the column of Recording Characteristics C/N, reduction of sensitivity is also observed. In examples in which the first recording layer is excessively thin, C/N is decreased and stability to room light as well as that to reading light are reduced although enough control signals are obtainable. This may be ascribed to the fact that the absorbance of a reading light is reduced relatively and the amount of transmitted light from the first recording layer to the second recording layer is increased.

In Comparative Examples M and N in which the film thickness of the second recording layer is excessively thick, it is found that enough control signals can not be obtained and $I_o$ is reduced as well. Further, recording characteristics are also reduced relatively.

In Comparative Examples O and P, in which the first and second recording layers are changed in order, it is observed that $I_o$ is seriously reduced and stabilities both to a reading light and to a room light are decreased.

In Comparative Examples Q and R in which the first recording layer is formed solely, no sufficient control signals are obtained.

In Comparative Examples T and U in which a cyanine dye having 7 carbon atoms in its main chain —(CH=CR)$_3$—CH— is used to form a single film layer and a second recording layer respectively, it is found that $I_o$ is reduced and stabilities both to a reading light and to a room light are insufficient.

TABLE 2

| Experiment No. | Number of organic dye solution | Number of revolution in spin coating (rpm) | Film thickness (nm) | Wavelength of testing light (nm) | Optical characteristics on subtrate side | | | Optical characteristics on dye layer side | | |
|---|---|---|---|---|---|---|---|---|---|---|
| | | | | | transmittance % | reflectance % | absorvance % | transmittance % | reflectance % | absorbance % |
| 1 | I | 2000 | 70 | 830 | 26 | 16 | 58 | 23 | 20 | 57 |
| 2 | II | 2000 | 60 | 830 | 29 | 18 | 53 | 26 | 23 | 51 |
| 3 | III | 2000 | 80 | 780 | 24 | 14 | 62 | 20 | 18 | 62 |
| 4 | IV | 2000 | 75 | 780 | 35 | 20 | 45 | 33 | 18 | 49 |
| 5 | V | 2500 | 80 | 830 | 32 | 14 | 54 | 28 | 19 | 54 |
| 6 | VI | 2500 | 60 | 830 | 50 | 33 | 17 | 48 | 38 | 14 |
| 7 | VII | 2500 | 50 | 780 | 60 | 24 | 16 | 64 | 28 | 8 |
| 8 | VIII | 2500 | 55 | 780 | 63 | 24 | 13 | 61 | 30 | 9 |
| 9 | IX | 2500 | 45 | 830 | 56 | 32 | 12 | 54 | 36 | 10 |
| 10 | X | 2500 | 50 | 830 | 53 | 36 | 11 | 50 | 41 | 9 |
| 11 | XI | 2000 | 60 | 780 | 58 | 23 | 19 | 52 | 30 | 18 |
| 12 | I | 500 | 240 | 830 | 8 | 14 | 78 | 7 | 16 | 77 |
| 13 | I | 5000 | 25 | 830 | 58 | 14 | 26 | 60 | 15 | 25 |
| 14 | IV | 500 | 250 | 780 | 7 | 15 | 78 | 6 | 18 | 76 |
| 15 | IV | 5000 | 22 | 780 | 62 | 12 | 26 | 64 | 14 | 22 |
| 16 | VI | 600 | 240 | 830 | 53 | 22 | 25 | 48 | 33 | 25 |
| 17 | IX | 600 | 230 | 830 | 49 | 28 | 23 | 42 | 35 | 23 |
| 18 | XII | 2500 | 55 | 830 | 15 | 30 | 55 | 9 | 38 | 53 |

TABLE 3

| Number of optical recording medium | Number of organic dye solution used in each layer | | Number of organic dye solution used in each layer | | Control signal evaluation | | | | |
|---|---|---|---|---|---|---|---|---|---|
| | first recording layer | second recording layer | first recording layer | second recording layer | Io (V) | absorbance $I_{top}/Io$ | $I_{SM}/Io$ | Ivfo/Io | Itr/Io |
| Example | | | | | | | | | |

TABLE 3-continued

| | | | | | | | | | |
|---|---|---|---|---|---|---|---|---|---|
| A | I | IX | 1 | 9 | 0.72 | 0.80 | 0.55 | 0.42 | 0.48 |
| B | II | X | 2 | 10 | 0.75 | 0.82 | 0.57 | 0.43 | 0.47 |
| C | III | XI | 3 | 11 | 0.64 | 0.78 | 0.55 | 0.40 | 0.45 |
| D | I | VI | 1 | 6 | 0.75 | 0.77 | 0.57 | 0.43 | 0.43 |
| E | IV | VII | 4 | 7 | 0.73 | 0.81 | 0.56 | 0.43 | 0.42 |
| F | IV | VIII | 4 | 8 | 0.71 | 0.82 | 0.55 | 0.42 | 0.45 |
| G | V | VI | 5 | 6 | 0.69 | 0.80 | 0.56 | 0.40 | 0.46 |
| Comparative Example | | | | | | | | | |
| H | I | IX | 12 | 9 | 0.42 | 0.70 | 0.33 | 0.27 | 0.33 |
| I | I | IX | 13 | 9 | 0.73 | 0.77 | 0.51 | 0.38 | 0.43 |
| J | I | VI | 12 | 16 | 0.50 | 0.72 | 0.37 | 0.27 | 0.31 |
| K | IV | VII | 14 | 7 | 0.50 | 0.74 | 0.30 | 0.26 | 0.33 |
| L | IV | VII | 15 | 7 | 0.72 | 0.78 | 0.50 | 0.36 | 0.41 |
| M | I | VI | 1 | 16 | 0.47 | 0.70 | 0.35 | 0.30 | 0.33 |
| N | I | IX | 1 | 17 | 0.46 | 0.64 | 0.32 | 0.25 | 0.30 |
| O | IX | I | 9 | 1 | 0.45 | 0.75 | 0.50 | 0.36 | 0.42 |
| P | VII | IV | 7 | 4 | 0.39 | 0.77 | 0.48 | 0.35 | 0.44 |
| Q | I | — | 1 | — | 0.38 | 0.77 | 0.31 | 0.25 | 0.36 |
| R | IV | — | 4 | — | 0.50 | 0.79 | 0.41 | 0.26 | 0.38 |
| T | XII | — | 18 | — | 0.65 | 0.81 | 0.48 | 0.39 | 0.34 |
| V | I | XII | 1 | 18 | 0.43 | 0.73 | 0,49 | 0.37 | 0.36 |

| Number of optical recording medium | Recording characteristics C/N (dB) | | | | Stability to reading light (times) | | Stability to room light |
|---|---|---|---|---|---|---|---|
| | 4 mW | 5 mW | 6 mW | 7 mW | 0.5 mW | 0.8 mW | |
| Example | | | | | | | |
| A | 46 | 53 | 53 | 53 | $10^5<$ | $10^5<$ | 98% |
| B | 44 | 52 | 52 | 52 | $10^5<$ | $10^5<$ | 97% |
| C | 43 | 50 | 51 | 51 | $10^5<$ | $10^5<$ | 100% |
| D | 47 | 53 | 53 | 53 | $10^5<$ | $10^5<$ | 100% |
| E | 45 | 52 | 53 | 53 | $10^5<$ | $10^5<$ | 98% |
| F | 47 | 50 | 51 | 52 | $10^5<$ | $10^5<$ | 97% |
| G | 46 | 49 | 50 | 50 | $10^5<$ | $10^5<$ | 98% |
| Comparative Example | | | | | | | |
| H | 42 | 46 | 48 | 48 | $10^5<$ | $10^5<$ | 100% |
| I | 28 | 40 | 46 | 52 | $10^5<$ | 20,000 | 94% |
| J | 40 | 45 | 49 | 49 | $10^5<$ | 30,000 | 94% |
| K | 41 | 43 | 48 | 49 | $10^5<$ | $10^5<$ | 100% |
| L | 21 | 35 | 41 | 48 | $10^5<$ | 24,000 | 93% |
| M | 25 | 37 | 41 | 46 | $10^5<$ | $10^5<$ | 97% |
| N | 26 | 38 | 42 | 44 | $10^5<$ | $10^5<$ | 98% |
| O | 32 | 38 | 42 | 46 | 40,000 | 5,000 | 81% |
| P | 30 | 36 | 40 | 45 | 60,000 | 7,000 | 75% |
| Q | 34 | 46 | 52 | 52 | $10^5<$ | $10^5<$ | 100% |
| R | 40 | 48 | 51 | 52 | $10^5<$ | $10^5<$ | 100% |
| T | 37 | 44 | 48 | 51 | 1.800 | 200 | 72% |
| V | 41 | 43 | 45 | 47 | 30,000 | 1,000 | 93% |

Description of evaluation method in Table 3:

A laser beam was irradiated to each optical recording medium on the substrate side by means of an optical disc evaluation instrument in which a semiconductor laser of 830 nm or 780 nm wavelength was used. Tests for control signals, recording characteristics and stability to a reading light were carried out while the revolution of the recording medium was so adjusted that the linear velocity attained 3 m/sec at the position of 35–40 mm from the center of the recording medium.

Evaluation of control signals:

The reading light power of 0.8 mW (on the medium) was adjusted to detect each output signal by a photodetector.

$I_o$: An output voltage corresponding to the amount of reflected light at the flat area (volt). The larger the better.

$I_{top}/I_o$: $I_{top}$ is an output voltage corresponding to the amount of reflected light at the writing area (groove or land). The ratio $I_{top}/I_o$ may preferably be 0.70 or higher. In the examples of the present invention, $I_{top}$ is an output voltage corresponding to the amount of reflected light on land.

$I_{SM}/I_o$: $I_{SM}$ is an output voltage corresponding to the amount of reflected light at the sector mark which is the longest of prepits. The ratio $I_{SM}/I_o$ may preferably be 0.40 or more.

$I_{vfo}/I_o$: $I_{vfo}$ is an output voltage corresponding to the amount of reflected light at VFO (variable frequency oscillation) mark which is the shortest of prepits. The ratio $I_{vfo}/I_o$ may preferably be 0.30 or above.

$I_{tr}/I_o$: $I_{tr}$ is called tracking error signal or push-pull signal which is a control signal necessary for tracing pregrooves, and is an output voltage obtained from the difference of the amounts of light entering two-divided photodetector. The ratio $I_{tr}/I_o$ may preferably be 0.4 or more.

Evaluation of recording characteristics:

While on-off operation was carried out with a frequency of 1 megaherz, recording laser power was adjusted at 4–7 mW (on the medium) to record signals on land. Thereafter, C/N value (unit: dB) was measured.

From the dependence of the C/N value on the recording laser power, recording sensitivity was evaluated.

Evaluation of stability to reading light:

The laser power of a recording light was adjusted at 0.5 mW and 0.8 mW, and by using the light, a recording medium was recorded at an output of 7 mW in the above-described manner. One of the lands of the recording medium was read out repeatedly (on every revolution of the medium, the laser beam was put back to the initial position), and the number of times was indicated until track off took place due to the deterioration of the recording medium. It is desirable to repeat the readout $10^5$ times or more without causing track off.

Evaluation of stability to room light:

Each of the optical recording media was allowed to stand horizontally in a room for 3 months with the substrate side facing upward. $I_o$ determined in the control signal measurement was tested again. The stability was evaluated by the degree of retention to the initial $I_o$.

What is claimed is:

1. An optical recording medium having a transparent substrate containing prepits, pregrooves or both for system control signals, which comprises:
   (a) a first recording layer formed on the substrate, comprising mainly one or more phthalocyanine dyes, one or more naphthalocyanine dyes, or one or more phthalonaphthalocyanine dyes, said dyes having a transmittance of 10-50%, and a absorbance of about 40% or more at the wavelength of a laser beam used to write information; and
   (b) a second recording layer in contact with air formed on said first recording layer, comprising mainly one or more polymethine dyes having an absorbance of about 20% or less and a reflectance of about 25% or more at the air boundary at the wavelength of the laser beam used to write or read out information or both.

2. The optical recording medium of claim 1, wherein the polymethine dye used in the second recording layer is a cyanine dye.

3. The optical recording medium of claim 2, wherein the cyanine dye has 5 carbon atoms in its main chain having the formula:

—(CR=CR)$_2$—CR=

4. The optical recording medium of claim 1, wherein the thickness of the first recording layer is in the range of 30-200 nm and the thickness of the second recording layer is 200 nm or less.

5. The optical recording medium of claim 1, wherein the depth of the prepits and pregrooves formed on the substrate is in the range of 50-200 nm.

6. A process for making an optical recording medium having a transparent substrate containing prepits, pregrooves or both for system control signals, which comprises:
   (a) providing a transparent substrate;
   (b) preparing two kinds of solutions, one solution comprising one or more low-polarity solvents and one or more phthalocyanine dyes, one or more naphthalocyanine dyes or one or more phthalonaphthalocyanine dyes soluble only in low-polarity solvents, and a second solution comprising one or more high-polarity solvents and one or more polymethine dyes soluble only in high-polarity solvents; and
   (c) applying said two kinds of solutions on said transparent substrate in sequence to form a first recording layer and a second recording layer thereon, thereby forming a bilayered structure.

7. The process of claim 6, wherein the low-polarity solvent has a dielectric constant of 4.5 or less at 20° C. and said high-polarity solvent has a dielectric constant of 12 or more at 20° C.

8. The process of claim 6, wherein the polymethine dye used in the second recording layer is a cyanine dye.

9. The process of claim 8, wherein the cyanine dye has 5 carbon atoms in the main chain having the formula:

—(CR=CR)$_2$—CR=.

* * * * *